United States Patent [19]

Jackson

[11] 4,397,795
[45] Aug. 9, 1983

[54] SEAL FOR ROTARY APPARATUS FOR GAS-LIQUID CONTACTING

[75] Inventor: Joseph F. Jackson, Halifax, England

[73] Assignee: Thomas Broadbent & Sons Limited, West Yorkshire, England

[21] Appl. No.: 284,943

[22] Filed: Jul. 20, 1981

[30] Foreign Application Priority Data

Aug. 1, 1980 [GB] United Kingdom ............... 8025242

[51] Int. Cl.³ ............................................. B01F 3/04
[52] U.S. Cl. ..................................... 261/89; 261/96; 277/14 V; 366/101
[58] Field of Search ..................... 261/88–90, 261/79 A; 209/169, 170; 210/219; 277/14 R, 14 V; 366/101, 102, 105; 422/225

[56] References Cited

U.S. PATENT DOCUMENTS

| 822,802 | 6/1906 | Wilkinson | 277/14 R |
| 2,699,225 | 1/1955 | Dahlbeck | 261/89 X |
| 2,941,872 | 6/1960 | Pilo et al. | 261/89 X |
| 3,596,885 | 8/1971 | Stone | 261/88 X |
| 3,653,187 | 4/1972 | Peterson | 261/89 X |
| 3,744,773 | 7/1973 | Velander | 261/88 |
| 3,765,688 | 10/1973 | Junker | 277/14 R |
| 3,910,585 | 10/1975 | Tabacchi | 277/14 V |
| 4,283,255 | 8/1981 | Ramshaw et al. | 261/88 X |

FOREIGN PATENT DOCUMENTS

| 155953 | 12/1904 | Fed. Rep. of Germany . | |
| 2400075 | 7/1974 | Fed. Rep. of Germany . | |
| 859097 | 1/1961 | United Kingdom | 261/89 |
| 1241412 | 8/1971 | United Kingdom | 261/89 |
| 1284596 | 8/1972 | United Kingdom . | |
| 1366312 | 9/1974 | United Kingdom | 261/89 |

*Primary Examiner*—Richard L. Chiesa
*Attorney, Agent, or Firm*—Cushman, Darby & Cushman

[57] ABSTRACT

In a gas-tight sealing device for rotary gas-liquid contacting apparatus, a liquid channel takes excess sealing liquid away from the seal to reduce viscous drag.

3 Claims, 9 Drawing Figures

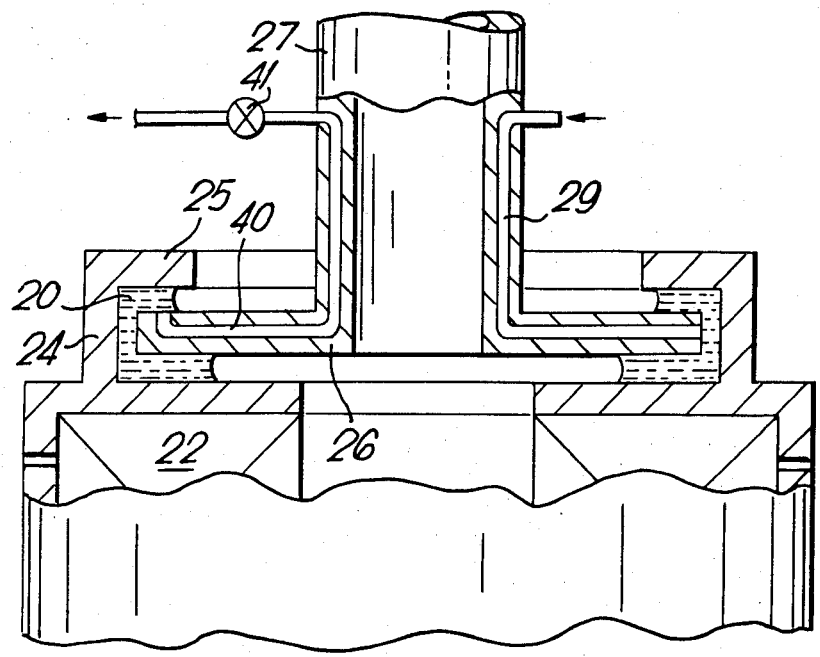

SEAL FOR ROTARY APPARATUS FOR GAS-LIQUID CONTACTING

This invention is concerned with rotary appparatus for contacting a liquid with a gas and is particularly concerned with gas-tight sealing devices formed between relatively rotatable parts of such apparatus. Throughout this patent specification, the word "gas" should be understood to include also vapours.

Many forms of rotary apparatus for effecting contact between a liquid and a gas have been described in the literature. One form of such apparatus comprises a rotatable member adapted to rotate at such speeds that liquid flowing radially outwardly through the rotatable member is subjected to high accelerations. The gas flows counter- or co-currently through the rotatable member and gas-liquid contact takes place within the rotatable member at high rates of mass transfer. However, in order to feed gas to and from the rotatable member when the latter is rotating at elevated speeds, it is necessary to use a sealing device whose components are relatively rotatable but which effectively prevents the passage of gas direct from inlet to outlet, thereby by-passing the rotatable member. In order to achieve this result at the operating pressure-difference while not unduly impeding free rotation of the rotary member, various types of seal have been proposed, including simple liquid traps such as those illustrated in British Pat. Nos. 757149 and 859097 and a dry labyrinthine device described in German OLS No. 2400075.

These prior types of seal have tended either to afford inadequate sealing against passage of gas or to entail undue resistance to rotation of the rotary member. In addition, in the case of a liquid trap in which a sealing volume of liquid is rotated at high speed (see for example the component identified at 62 in FIG. 3 of the drawings of UK Pat. No. 1241412), the radial forces operating on that liquid require a trap design of considerable strength and weight, which in turn means that the total weight to be rotated is unduly increased.

It is an object of the present invention to provide a sealing device of the rotary liquid trap type in which the volume of sealing liquid is reduced and which, as a consequence, entails a less heavy design.

According to the present invention, in rotary apparatus for contacting a liquid with a gas, in which a gas-tight seal is formed between two relatively rotatable parts and comprises a liquid chamber located upon or within a rotatable first part and a gas barrier projecting outwardly with respect to the axis of relative rotation into said liquid chamber from the second relatively rotatable part, a liquid channel leads from a point on said projecting barrier in the vicinity of the radially outermost point of said barrier.

It is preferred that the liquid channel be located within the projecting gas barrier and it is also preferred that the channel, while leading from a point in the vicinity of the radially outermost point, does not in fact lead from the outermost point itself. The channel is preferably of small cross-sectional area in order to limit or prevent any leakage of gas past the seal via the channel. If desired, a control valve may be disposed in the liquid flow from the channel to further minimise passage of gas through the channel; for example, the valve may automatically open to permit passage of liquid and restrict passage of gas.

When the rotary gas-liquid contact apparatus is operating and therefore the rotatable first part of the seal is rotating and gas and liquid are being introduced to the apparatus, the sealing liquid is retained in the liquid chamber by the centrifugal action of said rotation. Excess sealing liquid is propelled through the liquid channel which is a feature of our invention by the combined effects of said centrifugal action and of the differential pressure of the gas across the seal.

The sealing liquid may be the same as the liquid which is being treated in the gas-liquid contacting apparatus, in which case the excess liquid from the liquid channel may be conducted to combine with the liquid being treated. Alternatively, the sealing liquid may be different from that being treated, for example the sealing liquid may be of lower volatility, in which case the excess liquid from the liquid channel may be recirculated to the seal, either directly or via an external storage arrangement.

The liquid contained in the seal will be lost from the liquid chamber in various ways, including evaporation arising from frictional heating of the liquid by virtue of viscous drag on rotation of the liquid relative to the gas barrier. Fresh liquid is therefore added during operation. Such fresh liquid may be added via a liquid feed passage located adjacent to the liquid chamber. Advantageously, the passage may be in the form of a second liquid channel located within the projecting gas barrier which forms a part of the gas-tight seal of the present invention.

The two parts between which a seal is formed according to the present invention have been described as "relatively rotatable". The first such part upon or within which the liquid chamber is located is necessarily rotatable, so that liquid is retained within the chamber during rotation. The second such part may itself be rotatable or may be stationary.

BRIEF DESCRIPTION OF THE DRAWINGS

The invention will now be further described by reference to the accompanying drawings, in which:

FIG. 4 is a sectional view of a modified form of the liquid seal shown in FIG. 2.

DETAILED DESCRIPTION OF THE DRAWINGS

Figure 1:
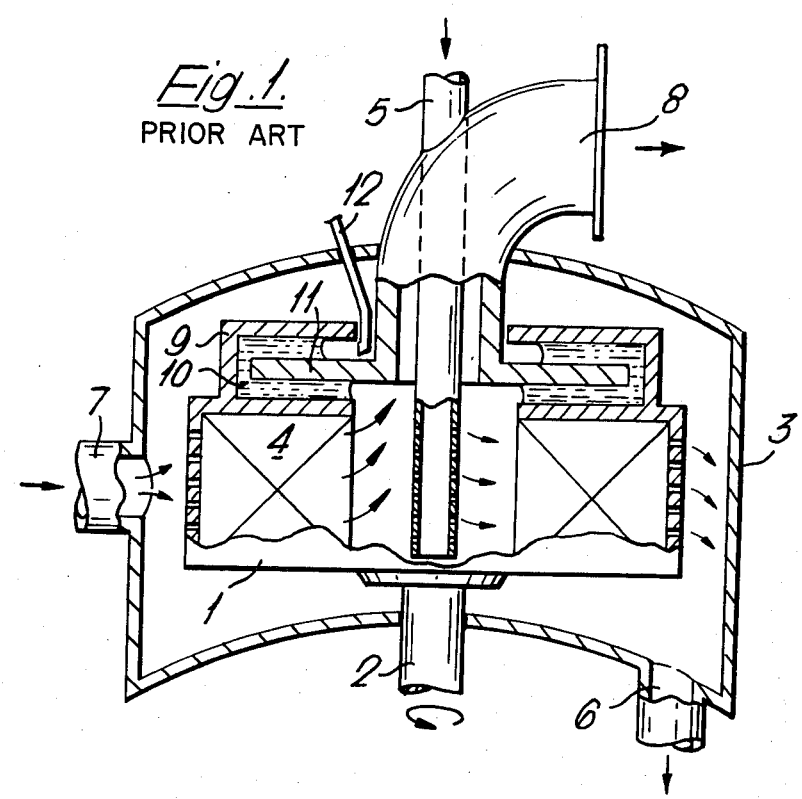
FIG. 1 illustrates in sectional view a form of gas-liquid contacting apparatus incorporating a conventional liquid seal.

The gas-liquid contacting apparatus of FIG. 1 comprises a rotary member 1 mounted upon a shaft 2 by means of which it is rotated within a casing 3. The rotary member 1 carriers a permeable packing 4 distributed as an annulus about the axis of rotation of the member 1.

Liquid to be treated by means of the apparatus is introduced via a liquid feed pipe 5 and is then sprayed through orifices in the lower end of pipe 5 on to the inner surface of the packing 4. Rotation of the member 1 subjects the liquid to high acceleration in a radial direction and the liquid permeates rapidly through the packing 4, encountering a counter-current flow of gas within the packing before being expelled from the outer surface of the latter and subsequently removed from the casing 3 via a liquid discharge pipe 6. The gas to be treated enters the apparatus via a gas feed pipe 7, passes under pressure radially inwardly through the packing 4 and is subsequently discharged through gas discharge pipe 8.

It will be understood that the function of the liquid seal (indicated generally at 9) is to prevent gas passing direct from feed pipe 7 to discharge pipe 8, thus by-passing the packing 4 and emerging from the apparatus untreated. The conventional form of seal 9 illustrated consists of an annular liquid chamber 10 mounted rigidly upon the upper surface of the rotary member 1 to rotate therewith and a gas barrier 11 in the form of a disc projecting from the lower end of discharge pipe 8 into the chamber 10.

In operation of the gas-liquid contacting apparatus, the chamber 10 is filled with a seal liquid (which may be the same as the liquid to be treated) by means of a seal liquid feed pipe 12. The seal liquid is retained in chamber 10 by the centrifugal action induced by rotation of the rotary member 1 and passage of gas through the seal is thereby prevented, provided that the liquid head in the chamber is sufficient to counter-balance the gas pressure difference across packing 4.

Inherent in the use of a liquid seal are two disadvantages. Firstly, the high-speed rotation of the volume of liquid in the seal entails a centrifugal effect tending to distort the liquid chamber 10 and the latter must therefore be of a robust (and therefore heavy) design. Secondly, the rotation of the liquid-containing chamber relative to the fixed barrier 11 gives rise to a viscous drag resisting rotation and thereby causing dissipation of energy, heating of the seal liquid and evaporational loss of the latter. It is to lessen these disadvantages that the seal according to the present invention has been invented.

Figure 2:
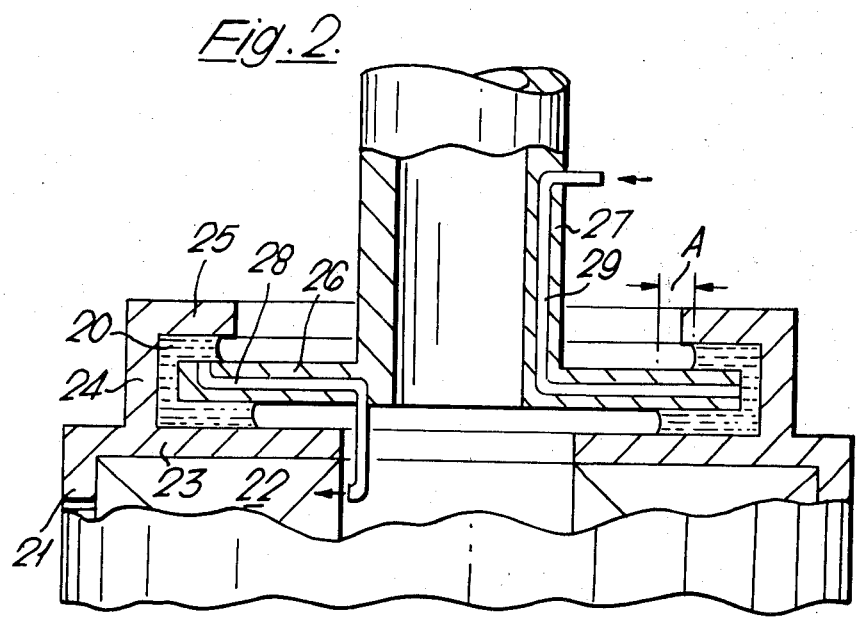
FIG. 2 is a sectional view on a larger scale of a liquid seal according to the present invention.

Referring to FIG. 2, a liquid chamber 20 is mounted directly upon a rotary member 21 containing permeable packing 22 and is defined by the upper wall 23 of the rotary member 21, and by a cylindrical outer chamber wall 24 and an annular upper chamber wall 25. A disc-shaped gas barrier 26, mounted upon the lower end of gas discharge pipe 27, projects radially outwardly into chamber 20. Within the thickness of barrier 26 is located a liquid channel 28, extending from a position in the chamber 20 in the vicinity of the radially outermost point of the barrier 26 and projecting at its other end into a space adjacent to the inner face of the packing 22. Also within the thickness of barrier 26 and extending into the wall of pipe 27 is located seal liquid feed pipe 29, by means of which seal liquid is introduced into chamber 20, both initially and also as necessary to replace liquid lost from chamber 20 during operation of the apparatus. While the particular embodiment illustrated has a single liquid channel 28 and a single seal liquid feed pipe 29, it is equally possible to provide two, three or more liquid channels and/or liquid feed pipes. Such multiple channels and/or pipes may be uniformly distributed about the circumference of the disc-shaped barrier 26.

During operation of a rotary apparatus incorporating the liquid seal shown in FIG. 2, the chamber 20 is filled with seal liquid and rotary member 21 is rotated. The pipe 27 and barrier 26 remain stationary. As the member 21 rotates, centrifugal action presses the seal liquid radially outwardly within chamber 20 and the liquid becomes so disposed that the difference between the radial positions of the liquid surface above and below the barrier 26 (the distance marked 'A' in FIG. 2) represents the liquid head necessary to counter-balance the difference in gas pressure across the packing 22. Since seal liquid is free to overflow through liquid channel 28, the datum line from which the liquid head extends will always lie at the entrance to channel 28.

Figure 3A:
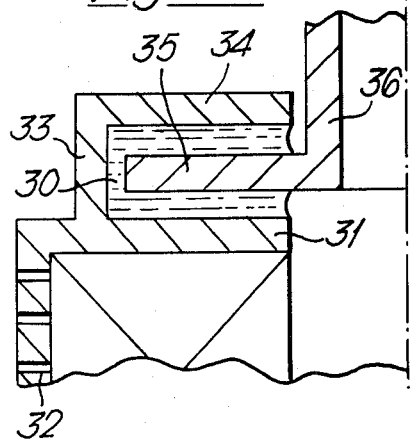
FIGS. 3a, 3c and 3e are partial, sectional views of a conventional liquid seal in three different operating conditions.
Figure 3B:
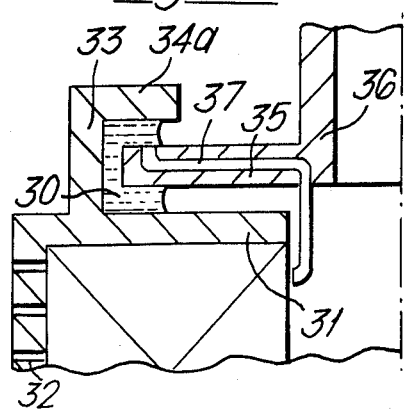
FIGS. 3b, 3d and 3f are partial, sectional views of a liquid seal according to the present invention in three operating conditions corresponding to those of FIGS. 3a, 3c and 3e respectively.
Figure 3C:
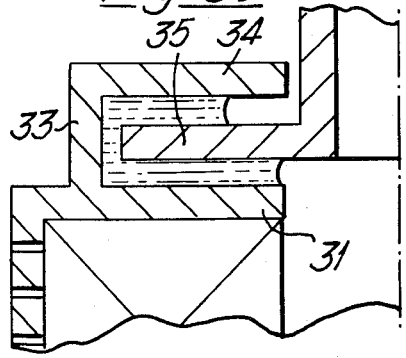
Figure 3D:
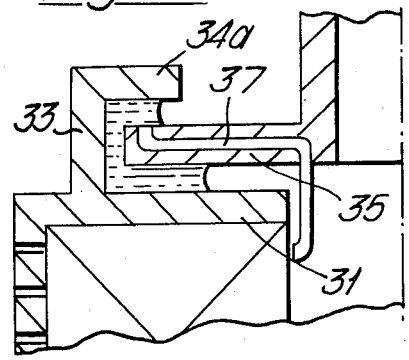
Figure 3E:
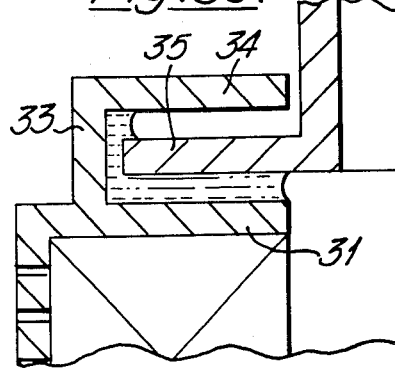
Figure 3F:
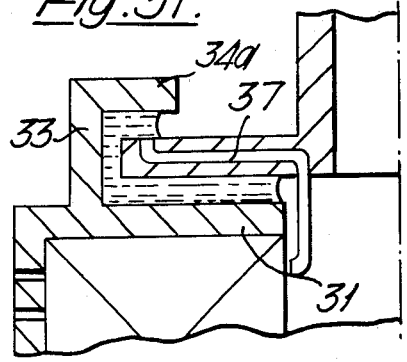

The significance of this datum line and the benefits arising from the provision of liquid channel 28 will be more readily understood by reference to FIGS. 3a to 3f, which illustrate the position of the seal liquid under three different operating conditions in a conventional liquid seal (FIGS. 3a, 3c and 3e) and under the same conditions in a liquid seal according to the present invention (FIGS. 3b, 3d and 3f). For the sake of clarity and to aid comparison, only the lefthand half of the seal is shown in each Figure.

The conventional seal illustrated in FIGS. 3a, 3c and 3e comprises a liquid chamber 30 defined by the upper wall 31 of a rotary member 32 and by a cylindrical outer chamber wall 33 and an annular upper chamber wall 34. A stationary disc-shaped barrier 35 projects from the bottom of gas discharge pipe 36 into the liquid chamber 30.

The seal according to the present invention illustrated in FIGS. 3b, 3d and 3f differs from the conventional seal in two respects. The provision of a liquid channel 37 makes it possible to employ a smaller liquid chamber and therefore the annular upper chamber wall 34a is radially much narrower than the corresponding wall 34 of the conventional seal.

FIGS. 3a and 3b show the seals in a condition in which the gas pressure difference across the seal is zero. In this condition, the radial positions of the liquid surface are the same above and below the gas barrier 35. However, this state is achieved with much less seal liquid in the case of the seal according to the present invention. A consequence of this difference is that the barrier 35 is much less deeply immersed in seal liquid and viscous drag in the pressure condition is greatly reduced.

FIGS. 3c and 3d illustrate a similar comparison with the gas pressure difference across the seal at an intermediate value. Again the volume of seal liquid is substantially less in the case of the seal according to the present invention.

FIGS. 3e and 3f illustrate a similar comparison at maximum gas pressure difference. In this condition, the volume of liquid in the two devices is substantially the same but the condition has been achieved, in the case of the present invention, without passing through an intermediate condition which required the upper chamber wall to be radially wide and massive.

A modified form of the seal according to FIG. 2 is shown in FIG. 4. In this form of seal, the liquid channel 28 is replaced by a modified liquid channel 40 which, instead of returning liquid to the treatment zone, leads via an extension in the wall of gas discharge pipe 27 away from the treatment zone. A control valve 41 is located downstream of the liquid channel and is designed to open to permit passage of liquid but to restrict passage of gas. Liquid discharged via liquid channel 40 and control valve 41 may be recycled as necessary via seal liquid feed pipe 29 to maintain the desired level of liquid in the chamber 20.

The seal design shown in FIG. 4 enables the use of a seal liquid different from the liquid to be treated in the gas-liquid contacting apparatus. By this means, a seal liquid may be chosen which has properties, for example low volatility, especially appropriate to the sealing function, without regard to its compatibility with the liquid undergoing treatment.

I claim:

1. In apparatus for contacting a liquid with a gas of the kind including a casing, a hollow rotary member within the casing, a stationary liquid inlet in communication with the interior of the rotary member, a stationary liquid outlet in communication with the casing, and a gas inlet and a gas outlet so disposed as to deliver and withdraw gas respectively from said apparatus, the arrangement being such that liquid flowing from the liquid inlet passes radially outwardly through the rotary member by centrifugal force during rotation of the rotary member and then to the liquid outlet and such that gas entering through the gas inlet passes through the rotary member in contact with the liquid and then to the gas outlet: an improved liquid seal assembly in the casing for preventing gas entering the gas inlet from bypassing the rotary member and flowing directly into said gas outlet, said seal assembly including means defining an annular liquid chamber coaxial with respect to the axis of rotation of the rotatable member and rotatable with the member so that liquid is held therein by centrifugal force during rotation, a disc-shaped gas barrier projecting into said chamber and dividing the chamber into a first leg which communicates with said casing and a second leg which communicates with the interior of said rotary member, and a conduit having an open end in communication with that leg of said annular liquid chamber which is on the gas inlet side of the gas barrier at a location spaced from the axis of rotation a distance slightly less than the radially outermost point of said barrier, said conduit having a second open end disposed outside said sealing chamber.

2. Apparatus as in claim 1 wherein said conduit is located within the gas barrier.

3. In apparatus for contacting a liquid with a gas of the kind including a casing having a gas inlet and a liquid outlet, a hollow rotary member within the casing, a stationary liquid inlet in communication with the interior of the rotary member, and a stationary gas outlet in communication with the interior of the rotary member, the arrangement being such that liquid flowing from the liquid inlet passes radially outwardly through the rotary member by centrifugal force during rotation of the rotary member and then to the liquid outlet and such that gas entering through the gas inlet passes radially inwardly through the rotary member in contact with the liquid and then to the gas outlet: an improved liquid seal assembly in the casing for preventing gas entering the casing from bypassing the rotary member and flowing directly into said gas outlet, said seal assembly including means defining an annular liquid chamber coaxial with respect to the axis of rotation of the rotatable member and rotatable with the member so that liquid is held therein by centrifugal force during rotation, a disc-shaped gas barrier projecting into said chamber and dividing the chamber into a first leg which communicates with said casing and a second leg which communicates with the interior of said rotary member, and a conduit having an open end in communication with said first leg at a location spaced from the axis of rotation a distance slightly less than the radially outermost point of said barrier, said conduit having a second open end disposed outside said chamber.

* * * * *

UNITED STATES PATENT AND TRADEMARK OFFICE
CERTIFICATE OF CORRECTION

PATENT NO. : 4,397,795
DATED : August 9, 1983
INVENTOR(S) : Joseph F. Jackson

It is certified that error appears in the above—identified patent and that said Letters Patent is hereby corrected as shown below:

On front page format:

Paragraph [73] should read:

--Assignee: Imperial Chemical Industries PLC, London, England--

Signed and Sealed this

Twenty-ninth Day of January 1985

[SEAL]

Attest:

DONALD J. QUIGG

Attesting Officer

Acting Commissioner of Patents and Trademarks